United States Patent [19]

Brinley

[11] Patent Number: 5,232,535
[45] Date of Patent: * Aug. 3, 1993

[54] PROCESS FOR PREPARING EMBOSSED, COATED PAPER

[75] Inventor: Charles E. Brinley, Addison, Mich.

[73] Assignee: Anthony Industries, Inc., Adrian, Mich.

[*] Notice: The portion of the term of this patent subsequent to Mar. 24, 2009 has been disclaimed.

[21] Appl. No.: 790,481

[22] Filed: Nov. 12, 1991

Related U.S. Application Data

[63] Continuation of Ser. No. 610,343, Nov. 5, 1990, Pat. No. 5,098,497, which is a continuation of Ser. No. 315,347, Feb. 23, 1989, abandoned.

[51] Int. Cl.$^5$ .............................................. B29C 47/00
[52] U.S. Cl. ................. 156/219; 156/244.11; 156/244.16; 427/362
[58] Field of Search .................... 156/209, 219, 244.11, 156/244.16; 428/151, 156, 172, 187, 904

[56] References Cited

U.S. PATENT DOCUMENTS

| | | | |
|---|---|---|---|
| 3,308,227 | 3/1967 | Power et al. | 156/219 |
| 3,799,827 | 3/1974 | Takimoto et al. | 156/219 |
| 3,959,546 | 5/1976 | Hill | 428/141 |
| 4,569,712 | 2/1986 | Shibano | 156/244.14 |
| 4,987,014 | 1/1991 | Woodward et al. | 156/209 |

FOREIGN PATENT DOCUMENTS 516368  1/1940  United Kingdom ............... 428/151

Primary Examiner—Peter Chin
Attorney, Agent, or Firm—Marshall & Melhorn

[57] ABSTRACT

Embossed, coated paper is prepared by a process in which a polymeric film is laminated to a paper web, utilizing an extrusion coated resin interlayer therebetween, and a pattern from an engraved chill roll is simultaneously embossed onto the exposed surface of the polymeric film.

7 Claims, 1 Drawing Sheet

PROCESS FOR PREPARING EMBOSSED, COATED PAPER

BACKGROUND OF THE INVENTION

This application is a continuation of application Ser. No. 07/610,343 filed on Nov. 5, 1990, now U.S. Pat. No. 5,098,497 which is a continuation of application Ser. No. 07/315,347 filed on Feb. 23, 1989, now abandoned.

FIELD OF THE INVENTION

This invention relates generally to the production of embossed, coated paper, and more particularly, to a process for laminating a polymeric film to a paper web utilizing an extrusion coated resin interlayer therebetween, while simultaneously embossing the polymeric film.

BACKGROUND OF THE INVENTION

Embossed, coated papers are used in a wide variety of products, such as for example simulated leather panels for automobiles, matte surface photographic base papers, etc. Generally, these products are prepared by heat laminating or extrusion coating a polymeric film onto a paper substrate, followed by embossing a desired pattern onto the exposed surface of the polymeric film.

Similarly, it is known to emboss a desired pattern onto a polymeric coating while extrusion coating the polymer onto a paper substrate, utilizing an engraved cooling roll. U.S. Pat. No. 3,959,546, for example, discloses a method for producing a photographic paper, wherein a polyolefin is extrusion coated onto a paper web and the composite is immediately passed between a nip roll and an engraved chill roll. The chill roll solidifies the polyolefin coating, and simultaneously imparts a matte finish to the exposed surface thereof.

U.S. Pat. No. 4,569,712 discloses a process for making a coated paper, comprising a paper substrate, a polymeric "release" layer, and an adhesion-promoting resin interlayer disposed therebetween. The polymer release layer and resin interlayer are co-extruded from a common T-die onto the advancing paper substrate web as it passes between a nip roll and a chill roll. The release layer and resin interlayer may have the same polymeric composition, but the release layer must contain 95% to 65% polypropylene and 5% to 35% polyethylene. The extrusion temperature of the resin interlayer is approximately 40° C. greater than the extrusion temperature of the polymeric release layer, to promote adhesion between the paper substrate and polymeric release layer. Finally, the surface gloss and configuration of the polymeric release layer may be adjusted by varying the chill roll of the laminator used in the extrusion coating process. The coated paper may be utilized for the manufacture of synthetic leather products.

SUMMARY OF THE INVENTION

Accordant with the present invention, it has surprisingly been discovered that an embossed, coated paper may be prepared by a novel process in which a polymeric film is laminated to a paper web utilizing an extrusion coated resin interlayer, and simultaneously, the exposed surface of the polymeric film is embossed utilizing an engraved chill roll.

The process comprises the steps of:
A) providing a web of paper;
B) providing a polymeric film;
C) extrusion coating a layer of resin onto the web of paper; and
D) simultaneously performing the steps of:
  i) contacting the polymeric film to the layer of resin, thereby forming a composite comprising the web of paper, polymeric film, and resin layer therebetween;
  ii) laminating the composite, by passing the composite between a nip roll and an engraved chill roll; and
  iii) embossing the exposed surface of the polymeric film.

The embossed, coated paper prepared by the process of the present invention may later be adhered to a core support member to produce simulated leather panels for automobile interiors.

BRIEF DESCRIPTION OF THE DRAWINGS

The novel features that are considered characteristic of the invention are set forth with particularity in the appended claims. The invention itself, however, will best be understood from the accompanying description of specific embodiments, when read in conjunction with the attendant drawing, in which:

DETAILED DESCRIPTION OF THE PREFERRED EMBODIMENT

Figure 1:
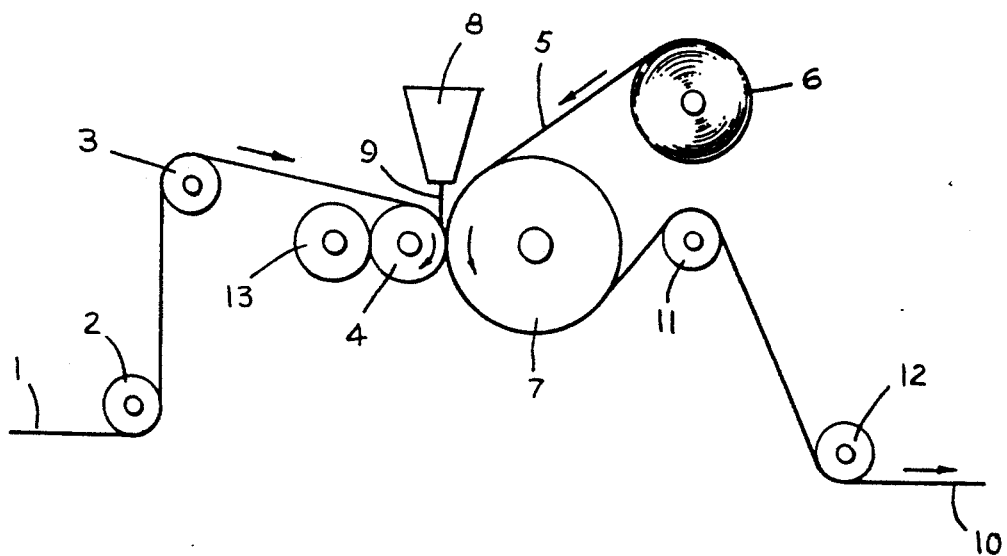
FIG. 1 is a schematic representation of an embodiment of the process of the present invention, illustrating the laminating, extrusion coating, and embossing operations.

Referring now to FIG. 1, there is shown a schematic representation of a process embodying the features of the present invention. A web 1 of paper advances from a supply roll (not shown) over consecutive guide rolls 2 and 3, onto a nip roll 4. Simultaneously, a polymeric film 5 advances from a supply roll 6 onto an engraved chill roll 7. A resin is melted in an extruder (not shown), extruded through a T-die 8 in the form of a sheet 9, and deposited onto the web 1 of paper. The web of paper 1, having a layer of extrusion coated resin thereon, and the polymeric film 5, are pressed together between the nip roll 4 and the engraved chill roll 7, and are thereby laminated. Simultaneously, the engraved chill roll 7 imparts an impression of the engraved pattern onto the exposed surface of the polymeric film 5. The embossed, coated paper 10 is parted from the engraved chill roll 7, passed over consecutive guide rolls 11 and 12, and accumulated on a take-up roll (not shown). The laminating pressure between the nip roll 4 and the engraved chill roll 7 is adjusted and maintained by contacting the nip roll 4 against a pressure back-up roll 13.

The papers suitable for use according to the present invention may be any of the papers conventionally known in the art for preparing coated papers, such as for example kraft paper, natural or synthetic pulp paper, paperboard, linerboard, cardboard, and the like. A preferred paper is kraft paper. The paper may additionally contain conventional paper adjuvants, such as for example strength increasing agents, sizing agents, dyes, fluorescent whitening agents, preservatives, fillers, antistatic agents, clays, kaolin, talc, barium sulfate, calcium carbonate, titanium dioxide, zinc oxide, etc. The thickness of the paper may range from about 5 mils to about 300 mils. Preferably the range is from about 5 mils to about 100 mils.

Suitable polymeric films for practicing the process of the present invention include, but are not limited to, films prepared from low, medium, or high density polyethylene, polypropylene, polyesters, polyurethanes, acrylics, polyesters, polyamides, polyvinyl acetate, polyvinyl chloride, styrenics, polybutadiene, and polycarbonate, as well as copolymers of ethylene and/or propylene with one or more copolymerizable monomers such as for example styrene, vinyl acetate, acrylic acid, methacrylic acid, methyl methacrylate, butadiene and isoprene. Also included are blends and copolymers of these materials. A preferred polymeric film is high, medium or low density polyethylene. The thickness of the polymeric film may vary from about 0.3 mil to about 10 mils. Preferably, the thickness ranges from about 0.5 mil to about 1 mil.

The resins, which are suitable for extrusion coating onto the paper web, are those previously listed as useful for preparing the polymeric film. A preferred resin is high, medium or low density polyethylene.

The nip roll 4 is typically a rubber or rubber covered roll, having a Durometer hardness from about 50 to about 75. The hardness of this roll is important as it allows the engraving on the chill roll to recess slightly, to assist in the transfer of the engraved pattern to the exposed surface of the polymeric film. Other materials, having a similar hardness and resiliency as rubber, may be used to form the nip roll 4. The pressure back-up 13 roll urges the nip roll 4 toward the engraved chill roll 7, and may itself be cooled by passing a cooling medium, e.g. water, through the interior thereof in order to extract accumulated heat energy from the nip roll 4. The pressure between the nip roll 4 and engraved cooling roll 7, as applied by the pressure back-up roll 13, is generally from about 10 pounds per linear inch (pli) to about 200 pli. Preferably, the pressure is from about 50 pli to about 150 pli. A most preferred nip roll is a rubber or rubber covered roll, having a Durometer hardness of about 60, which is urged toward the engraved chill roll so as to result in a pressure therebetween from about 80 pli to about 100 pli.

The surface of the chill roll 7 is etched utilizing an appropriate acid solution to produce the desired pattern having a depth of about 2.5 mils to about 5 mils. Thereafter, the surface optionally may be sandblasted to produce such as for example an 80 to 100 RMS dull or matte finish, depending upon the finish desired for the final product. Finally, the chill roll 7 is chrome plated to prevent deterioration of its surface, thereby producing an engraved chill roll for embossing the polymeric film. The chill roll 7 is cooled by any conventional technique, such as for example by passing a cooling medium, e.g., water through the interior thereof. The temperature of the engraved chill roll 7 is generally maintained from about 55° F. to about 150° F.

The resin may be melted in any conventional extrusion apparatus generally known in the art, and discharged from a device 8 commonly known as a T-die to form a falling sheet 9 of resin which is deposited onto the advancing paper web 1. This process is conventionally referred to as extrusion coating. The resin is extruded at such a rate so as to form a layer from about 0.3 mils to about 5. mils thick. Preferably the thickness is from about 0.5 mil to about 1.5 mils. At the extrusion T-die 8, the resin temperature is maintained at a temperature from about 500° F. to about 700° F. Preferably, the extrusion temperature is from about 580° F. to about 625° F. In order to provide the correct thickness of extruded resin, the extrusion rate at the T-die 8 must, of course, be coordinated with the paper web and polymeric film advancement rates or running speed. Typical running speeds range from about 50 ft/min to about 500 ft/min. Preferably, the running speed is from about 350 ft/min to about 450 ft/min.

In operation, the web 1 of paper and polymeric film 5 are advanced at the same rate into the nip assembly, such that the paper web 1 is adjacent the surface of the nip roll 4 and the polymeric film is adjacent the surface of the engraved cooling roll. Immediately prior to entering the nip, the paper web 1 is extrusion coated with a layer of resin. Generally, the extruded molten resin 9 meets the paper web 1 while the paper web 1 is in contact with the nip roll 4 but before the paper web 1 enters the nip. However, also contemplated as equivalent in operability and utility is the extrusion of the molten resin in such a manner so as to descent substantially directly into the nip.

As the paper web 1, having the layer of resin thereon, and the polymeric film 5 enter the nip, the polymeric film 5 contacts the molten resin 9, thereby forming a composite 10 comprising sequential layers of paper, molten resin, and the polymeric film. This raises the temperature of the polymeric film 5 above its plastic set temperature, i.e., the temperature above which an applied stress will cause permanent deformation of the polymeric film. The exposed surface of the film, i.e., the surface of the film opposite the surface in contact with the molten resin 9, is then able to assume the pattern of the engraved chill roll 7.

In the nip, between the nip roll 4 and engraved chill roll 7, the composite is laminated by pressing the layers together, and simultaneously the exposed surface of the polymeric film is embossed. As the embossed, coated paper 10 exits the nip, the resin and polymeric film 5 layers cool below their plastic set temperatures as a result of heat energy transfer from the resin and polymeric film to the engraved chill roll 7. At a subsequent position on the circumference of the chill roll 7, the embossed, coated paper 10 is parted from the engraved chill roll 7, thereby imparting the engraved pattern of the chill roll 7 onto the embossed coated paper 10.

This process has advantageously been employed to produce embossed, coated papers having simulated Corinthian and Montana grain leather surfaces, useful for manufacturing interior automotive decorative panels.

It must be noted that the process conditions are not sharply critical for the successful laminating of a polymeric film to a paper web utilizing an extrusion coated resin interlayer and simultaneous embossing of the polymeric film, according to the present invention. The process conditions described hereinabove are generally disclosed in terms which are conventional in the art to the practice of this invention. Occasionally, however, the process conditions as described may not be precisely applicable for each compound included within the disclosed scope. Those compounds for which this occurs will be readily recognizable by those ordinarily skilled in the art. In all such cases, either the process may be successfully performed by conventional modifications known to those ordinarily skilled in the art, e.g., by increasing or decreasing the extrusion temperature or web speed, by varying the thicknesses of the polymeric film, by routine modifications of the nip lamination pressure or nip roll hardness, etc., or other process conditions which are otherwise conventional will be applicable to the practice of the invention.

The invention is more easily comprehended by reference to specific embodiments which are representative of the invention. It must be understood, however, that the specific embodiments are provided only for the purpose of illustration, and that the invention may be practiced otherwise than as specifically illustrated without departing from its spirit and scope.

EXAMPLE

Kraft paper having a thickness of 9 mils, and high density polyethylene film having a thickness of 1 mil, are simultaneously fed into the nip formed between a rubber nip roll having a Durometer hardness of 60 and an engraved, chrome-plated chill roll. The running speed for the operation is approximately 400 ft/min. High density polyethylene resin is extrusion coated at a temperature of 620° F. onto the paper substantially at the nip, at a rate so as to form a 0.5 mil layer between the kraft paper and polyethylene film. The composite, comprising kraft paper, high density polyethylene film, and high density polyethylene resin therebetween, is laminated between the nip roll and engraved chill roll, at a pressure of approximately 80 pli. Simultaneously, the polyethylene film, which is softened by contact with the hot polyethylene resin, is embossed by the engraved chill roll, which has a leather-like pattern engraved thereon and is cooled by a stream of 45° F. water at 40 gpm. The embossed, coated paper thus produced is parted from the engraved chill roll, thereby imparting the pattern of the engraved chill roll onto the exposed surface of the polyethylene film. The embossed, coated paper may thereafter by used to prepare simulated leather panels for the interiors of automobiles.

What is claimed is:

1. A process for preparing an embossed, coated paper, consisting essentially of the steps of simultaneously:
    A) providing in superposed relationship a web of paper and a layer of fluid polymeric thermoplastic material;
    B) laminating the paper and polymeric material, by passing the paper and polymeric material between a nip roll and a chill roll engraved to a depth from about 2.5 mils to about 5 mils, where the pressure between the nip roll and the chill roll is from about 20 pli to about 200 pli, and the nip roll has a hardness such that the surface of the nip roll conforms to the depth of engraving of the chill roll under the pressure between the nip roll and the chill roll; and
    C) embossing the exposed surface of the polymeric material to a depth from about 2.5 mils to about 5 mils.

2. A process as defined in claim 1 in which the polymeric material is polyethylene.

3. A process as defined in claim 1 in which the polymeric material is polyethylene, the nip roll being of rubber and having a surface with a durometer hardness of about 60, and the presence therein the nip roll and chill roll being about 80 pli.

4. A process for preparing an embossed, coated paper, the process consisting essentially of the similar steps of:
    (a) providing superimposed relationship a web of paper and a layer of softened, deformable high density polyethylene;
    (b) simultaneously laminating the polyethylene and paper by passing the softened polyethylene and paper between a nip roll and a chill roll engraved to a depth of about 2.5 to 5 mils and the surface of the nip roll conforming to the depth of the engraving of the chill roll under a pressure between the rolls of about 20 to 200 pli; and
    (c) simultaneously with step (b), embossing the exposed softened surface of the polyethylene to a depth of about 2.5 to 5 mils to provide a laminate especially adapted for simulated leather panels for automobiles.

5. A process as defined in claim 4 in which the nip roll is rubber and the surface has a durometer hardness of about 60 and the pressure between the nip roll and the chill roll is about 80 pli.

6. A process as defined in claim 4 in which the papers is Kraft and the thickness of the Kraft paper is about 9 mils, and the thickness of the polyethylene layer is about 1 mil.

7. A process for preparing an embossed coated kraft paper having the appearance of simulated leather, the process composed of the steps of:
    (a) providing in superimposed relationship a web of kraft paper having the thickness of about 9 mils and a softened, deformable high density polyethylene layer;
    (b) simultaneously laminating the polyethylene and kraft paper by passing the softened polyethylene and paper between a nip roll and a chill roll engraved to a depth of about 2.5 to 5 mils and the surface of the nip roll conforming to the depth of the engraving of the chill roll under a pressure between the rolls of about 20 to 200 pli; and
    (c) simultaneously with steps (a) and (b), embossing the exposed softened surface of the polyethylene to a depth of about 2.5 to 5 mils to provide a laminate having an appearance of simulated leather.

* * * * *